(12) United States Patent
Tai et al.

(10) Patent No.: US 10,139,545 B2
(45) Date of Patent: Nov. 27, 2018

(54) FRONT LIGHT DISPLAY DEVICE AND MANUFACTURING THEREOF

(71) Applicant: E Ink Holdings Inc., Hsinchu (TW)

(72) Inventors: Sheng-Chieh Tai, Hsinchu (TW); I-Jeng Chen, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 260 days.

(21) Appl. No.: 14/857,819

(22) Filed: Sep. 17, 2015

(65) Prior Publication Data
US 2016/0291238 A1 Oct. 6, 2016

Related U.S. Application Data

(60) Provisional application No. 62/141,865, filed on Apr. 2, 2015.

(30) Foreign Application Priority Data

Jul. 8, 2015 (TW) .............................. 104122194 A (51) Int. Cl.
*F21V 8/00* (2006.01)
*G02F 1/1333* (2006.01)
(Continued)

(52) U.S. Cl.
CPC ............. *G02B 6/0043* (2013.01); *G02B 6/00* (2013.01); *G02B 6/0053* (2013.01);
(Continued)

(58) Field of Classification Search
CPC ...... G02B 6/11; G02B 6/0018; G02B 6/0036; G02B 6/0038; G02B 6/005; G02B 6/0053;
(Continued)

(56) References Cited

U.S. PATENT DOCUMENTS 6,266,108 B1 7/2001 Bao et al.
6,340,999 B1 1/2002 Masuda et al.
(Continued)

FOREIGN PATENT DOCUMENTS

CN 1384391 A 12/2002
CN 1396483 A 2/2003
(Continued)

OTHER PUBLICATIONS

US 8,789,996, 07/2014, Wang et al. (withdrawn)
(Continued)

*Primary Examiner* — Hargobind S Sawhney
(74) *Attorney, Agent, or Firm* — CKC & Partners Co., Ltd.

(57) ABSTRACT

A front light display device includes a reflective display module, a light guide plate, an optical clear adhesive, plural microstructures, and a light source. The light guide plate has a first surface and a second surface opposite to the first surface, and a third surface adjacent to the first and second surfaces. The light guide plate is made of a material including glass. The optical clear adhesive is located between the reflective display module and the first surface of the light guide plate. The microstructures are located on the first surface of the light guide plate. The light source faces the third surface of the light guide plate.

11 Claims, 5 Drawing Sheets

(51) Int. Cl.
  *G06F 3/042* (2006.01)
  *G02B 6/00* (2006.01)
(52) U.S. Cl.
  CPC ......... *G02B 6/0065* (2013.01); *G02B 6/0076* (2013.01); *G02B 6/0088* (2013.01); *G02B 6/0093* (2013.01); *G02F 1/13338* (2013.01); *G06F 3/0428* (2013.01); *G06F 2203/04103* (2013.01)
(58) Field of Classification Search
  CPC .. G02B 6/0055; G02B 6/0065; G02B 6/0068; G02B 6/0073; G02B 6/0091; G02F 1/133502; G02F 1/133553; G02F 2201/38; G02F 2203/023; G02F 1/13338; G02F 1/133514; G02F 1/133615; G02F 2001/133615; G02F 2202/28
  See application file for complete search history.

(56) References Cited

U.S. PATENT DOCUMENTS

| | | | |
|---|---|---|---|
| 6,362,815 B1* | 3/2002 | Leenhouts | G06F 3/041 345/102 |
| 6,545,734 B2 | 4/2003 | Cornelissen et al. | |
| 6,618,104 B1 | 9/2003 | Date et al. | |
| 6,650,382 B1 | 11/2003 | Sumida et al. | |
| 6,738,051 B2* | 5/2004 | Boyd | G02B 6/0023 345/176 |
| 6,750,996 B2 | 6/2004 | Jagt et al. | |
| 6,871,976 B2 | 3/2005 | Niida et al. | |
| 6,940,570 B1 | 9/2005 | Sumida et al. | |
| 6,969,187 B2 | 11/2005 | Niida et al. | |
| 7,889,284 B1* | 2/2011 | Nemeth | G02F 1/13338 345/173 |
| 8,300,304 B2 | 10/2012 | Gally et al. | |
| 8,373,821 B2 | 2/2013 | Sampsell et al. | |
| 8,979,342 B2* | 3/2015 | Neugebauer | G02B 6/0043 349/63 |
| 9,164,309 B2* | 10/2015 | Rappoport | G02B 1/118 |
| 9,684,338 B1* | 6/2017 | Menon | G06F 1/1643 |
| 2006/0262568 A1* | 11/2006 | Blom | G02B 6/0038 362/625 |
| 2012/0140151 A1* | 6/2012 | Yoshimura | G02B 5/3041 349/96 |
| 2013/0063967 A1* | 3/2013 | Luo | G06F 3/042 362/603 |
| 2013/0063969 A1* | 3/2013 | Neugebauer | G02B 6/0036 362/603 |
| 2013/0335673 A1* | 12/2013 | Moriwaki | G09F 9/3026 349/63 |
| 2014/0062939 A1* | 3/2014 | Zehner | G06F 3/044 345/174 |
| 2014/0286045 A1* | 9/2014 | Pao | G02B 6/005 362/607 |
| 2014/0320458 A1* | 10/2014 | Wu | G06F 3/042 345/175 |
| 2015/0003104 A1* | 1/2015 | Huang | G02B 6/005 362/606 |
| 2015/0004382 A1* | 1/2015 | Menon | G06F 3/147 428/212 |

FOREIGN PATENT DOCUMENTS

| | | |
|---|---|---|
| CN | 101669050 A | 3/2010 |
| CN | 102767748 A | 11/2012 |
| CN | 102999226 A | 3/2013 |
| CN | 103631450 A | 3/2014 |
| CN | 103809785 A | 5/2014 |
| CN | 103941458 A | 7/2014 |
| CN | 103941472 A | 7/2014 |
| CN | 203706159 U | 7/2014 |
| CN | 104064118 A | 9/2014 |
| CN | 104133569 A | 11/2014 |
| CN | 104282225 A | 1/2015 |
| TW | 200911528 A | 3/2009 |
| TW | M431374 U | 6/2012 |
| TW | 201313451 A | 4/2013 |
| TW | 201437702 A | 10/2014 |
| TW | 201441735 A | 11/2014 |
| TW | 201502609 A | 1/2015 |

OTHER PUBLICATIONS

Corresponding Taiwanese Office Action that these art references were cited on Jul. 25, 2016.
Corresponding Chinese office action dated Jul. 30, 2018.

* cited by examiner

FRONT LIGHT DISPLAY DEVICE AND MANUFACTURING THEREOF

RELATED APPLICATIONS

This application claims priority to U.S. Provisional Application Ser. No. 62/141,865, filed Apr. 2, 2015, and Taiwanese Application Serial Number 104122194, filed Jul. 8, 2015, the disclosures of which are incorporated herein by reference in their entireties.

BACKGROUND

Field of Invention

The present invention relates to a front light display device and a manufacturing method of the front light display device.

Description of Related Art

In a typical electrophoresis display device with front illumination, a substrate, an electrode, a microcapsule layer, another electrode, an transparent substrate, an optical clear adhesive (OCA), a protection sheet, another optical clear adhesive, a light guide plate (LGP), another optical clear adhesive, an anti-glare film (AG film) are stacked in sequence from the bottom to the top of the electrophoresis display device. Moreover, a waterproof glue surrounds the side surfaces of the substrate, the electrode, the microcapsule layer, another electrode, the transparent substrate, the optical clear adhesive, and the protection sheet, thereby preventing moisture from entering the inner portion of the electrophoresis display device, thus extending the operation life of the electrophoresis display device.

According to the aforesaid structure, besides the substrate located at the bottom of the typical electrophoresis display device, the typical electrophoresis display device includes the transparent substrate and the protection sheet, and has three layers of the optical clear adhesives. After light emitted by a light source enters the light guide plate, the light would sequentially pass through the optical clear adhesive, the protection sheet, another optical clear adhesive, the transparent substrate, and the electrode. Finally, the light is transmitted to the microcapsule layer. In the traveling path of the light, the light passes through the materials of all of the aforesaid layers. Because the refraction indexes of the aforesaid layers are not the same, interface reflections are formed at the interfaces between every two adjacent layers. As a result, the optical contrast of the typical electrophoresis display device is difficult to be improved.

Since the typical electrophoresis display device has a large number of components therein, a large number of interfaces between every two adjacent layers are formed in the typical electrophoresis display device. Hence, not only the optical contrast is degraded, but also the thickness of the electrophoresis display device is difficult to be reduced.

SUMMARY

An aspect of the present invention is to provide a front light display device.

According to an embodiment of the present invention, a front light display device includes a reflective display module, a light guide plate, an optical clear adhesive, plural microstructures, and a light source. The light guide plate has a first surface and a second surface opposite to the first surface, and a third surface adjacent to the first and second surfaces. The light guide plate is made of a material including glass. The optical clear adhesive is located between the reflective display module and the first surface of the light guide plate. The microstructures are located on the first surface of the light guide plate. The light source faces the third surface of the light guide plate.

Another aspect of the present invention is to provide a manufacturing method of a front light display device.

According to an embodiment of the present invention, a manufacturing method of a front light display device includes the following steps. Plural microstructures are formed on a first surface of a light guide plate, and the light guide plate is made of a material including glass. An optical clear adhesive is utilized to adhere the first surface of the light guide plate to a reflective display module.

In the aforementioned embodiments of the present invention, the light guide plate made of glass has a waterproof function, so that the light guide plate not only has a light guide function, but also may be utilized as the packaging element of the front light display device. Hence, a transparent substrate, a protection sheet, and two layers of optical clear adhesives in a typical electrophoresis display device may be omitted for the front light display device of the present invention, thereby reducing the number of interfaces between every two adjacent layers. As a result, the light reflections occurring at the interfaces between every two adjacent layers are decreased, such that the optical contrast of the front light display device is improved. Furthermore, since the number of components forming the front light display device is small, the thickness of the front light display device can be reduced, thereby facilitating thinning design of the display device. In an embodiment of the present invention, a surface treatment may be performed on the light guide plate that is made of glass to selectively form the microstructures, a touch sensing layer, a transparent lower refraction index layer, and a surface treatment layer on the surface of the light guide plate, thereby improving the function or the optical quality of the front light display device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
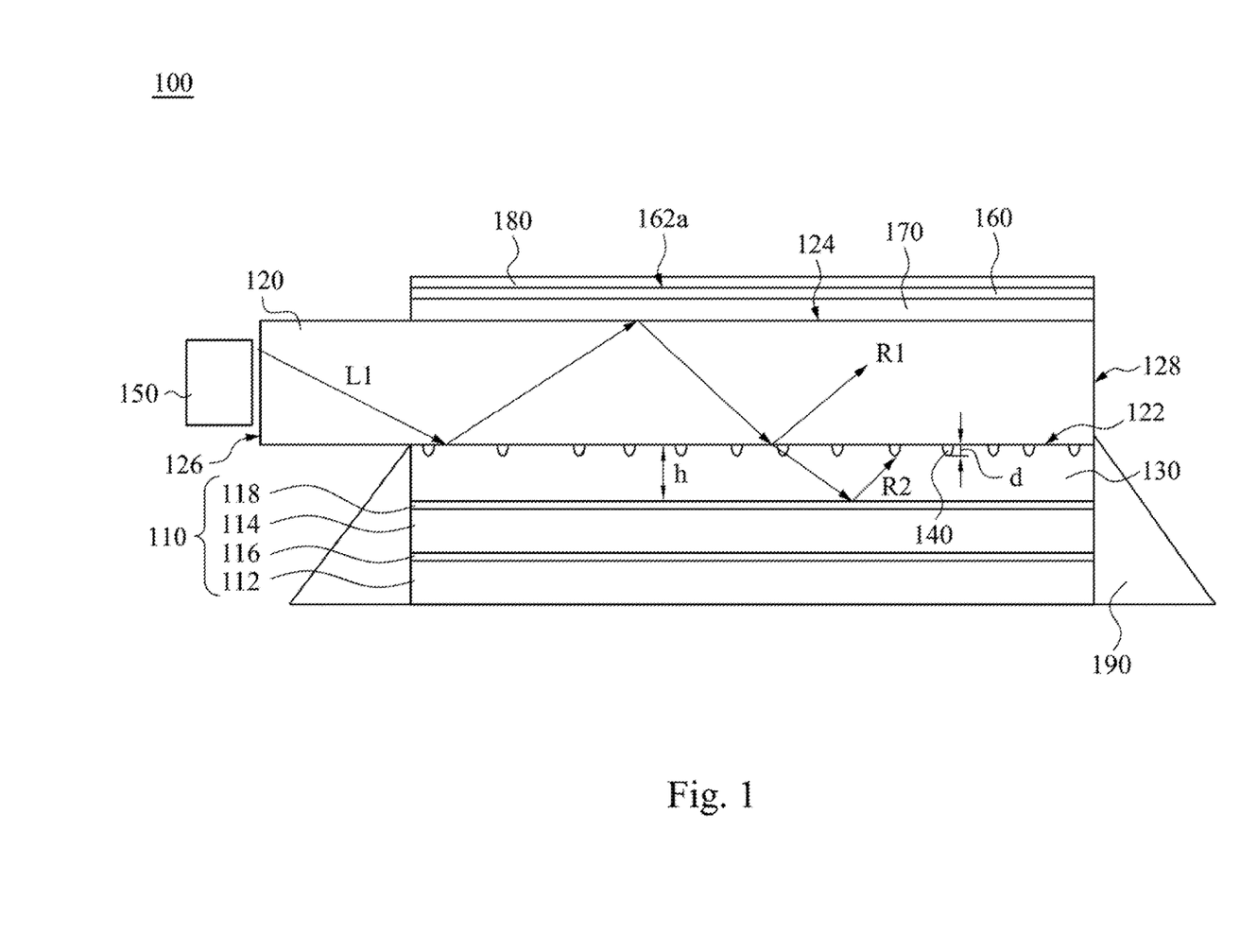
FIG. 1 is a cross-sectional view of a front light display device according to one embodiment of the present invention.

Reference will now be made in detail to the present embodiments of the invention, examples of which are illus- FIG. 1 is a cross-sectional view of a front light display device 100 according to one embodiment of the present invention. As shown in FIG. 1, the front light display device 100 includes a reflective display module 110, a light guide plate 120, an optical clear adhesive 130, plural microstructures 140, and a light source 150. The light guide plate 120 has a first surface 122 and a second surface 124 opposite to the first surface 122, and a third surface 126 adjacent to the first and second surfaces 122, 124. The light guide plate 120 is made of a material including glass. The optical clear adhesive 130 is located between the reflective display module 110 and the first surface 122 of the light guide plate 120. The microstructures 140 are located on the first surface 122 of the light guide plate 120. The light source 150 faces the third surface 126 of the light guide plate 120. The light source 150 may be, but is not limited to, a light emitting diode (LED). When the light source 150 emits light, light L1 enters the light guide plate 120 from the third surface 126 of the light guide plate 120. The light L1 may be transmitted in the light guide plate 120 and exit from the first surface 122 of the light guide plate 120. Thereafter, the light L1 may be refracted to the reflective display module 110 by the microstructures 140, thereby enabling the front light display device 100 to display an image.

In this embodiment, the reflective display module 110 may be an electrophoresis display module, which includes a substrate 112, an electronic ink layer 114, a pixel electrode layer 116, and a common electrode layer 118. The pixel electrode layer 116 is located between the substrate 112 and the electronic ink layer 114, and the common electrode layer 118 is located between the optical clear adhesive 130 and the electronic ink layer 114. The electronic ink layer 114 is used to reflect light that is emitted from the first surface 122 of the light guide plate 120, such that the light is reflected to the outside of the front light display device 100 and received by users.

Since the light guide plate 120 made of glass has a waterproof function, the light guide plate 120 of the present invention not only has a light guide function, but also may be utilized as the packaging element of the front light display device 100 to protect the reflective display module 110. Compared with the prior art, a transparent substrate, a protection sheet, and two layers of optical clear adhesives in a typical electrophoresis display device may be omitted in the front light display device 100 of the present invention, thereby reducing the number of interfaces between every two adjacent layers. As a result, the light reflections occurring at the interfaces between every two adjacent layers are decreased, such that the optical contrast of the front light display device 100 is improved. For example, the light L1 shown in FIG. 1 only results in reflective lights R1, R2 respectively occurring at the interface between the light guide plate 120 and the optical clear adhesive 130 and at the interface between the optical clear adhesive 130 and the common electrode layer 118, thus effectively reducing visual interference. Moreover, since the number of components forming the front light display device 100 of the present invention is small, the thickness of the front light display device 100 may be reduced, thereby facilitating thinning design of the display device.

In addition, a surface treatment may be performed on the light guide plate 120 that is made of glass to selectively form the microstructures 140, a touch sensing layer 160, a transparent lower refraction index layer 170, and a surface treatment layer 180 on the surface of the light guide plate 120, thereby improving the function or the optical quality of the front light display device 100. In the following description, the structures and usages of the aforesaid layers will be further described.

In one embodiment, the thickness of the optical clear adhesive 130 is greater than the height of each of the microstructures 140. In this embodiment, when the thickness of the optical clear adhesive 130 is h, and the height of each of the microstructures 140 is d, h>5d. As a result of such a design, when the light guide plate 120 is adhered to the reflective display module 110 by utilizing the optical clear adhesive 130, the optical clear adhesive 130 may fill a step difference between the microstructure 140 and the first surface 122 of the light guide plate 120, thereby preventing the formation of bubbles. Moreover, the microstructures 140 are made of a material including an ultra-violet curing adhesive. When the microstructures 140 are manufactured, the ultra-violet curing adhesive may be coated on the first surface 122 of the light guide plate 120. Thereafter, the ultra-violet curing adhesive may be shaped through a laminating or rolling process, and cured by the irradiation of an ultra-violet light. The microstructures 140 may effectively scatter the light L1 emitted from the first surface 122 of the light guide plate 120 to the electronic ink layer 114 of the reflective display module 110, such that the brightness and uniformity of the front light display device 100 can be improved.

In addition, the front light display device 100 further includes the touch sensing layer 160 that is located on the second surface 124 of the light guide plate 120, the transparent lower refraction index layer 170, and the surface treatment layer 180. The transparent lower refraction index layer 170 is located between the touch sensing layer 160 and the light guide plate 120, and the refraction index of the transparent lower refraction index layer 170 is smaller than the refraction index of the light guide plate 120. The refraction index of the touch sensing layer 160 is about 1.6, the refraction index of the light guide plate 120 that is made of glass is about 1.52, and the refraction index of the transparent lower refraction index layer 170 may be in a range from 1.3 to 1.45. As a result, the transparent lower refraction index layer 170 may reflect the light L1 of the light source 150, such that a total reflection of the light L1 is formed at the interface between the transparent lower refraction index layer 170 and the light guide plate 120. Hence, the light guide efficacy of the light guide plate 120 can be improved, and the light L1 is prevented from dissipating through the second surface 124 of the light guide plate 120.

The touch sensing layer 160 may enable front light display device 100 to have a touch-control function. The touch sensing layer 160 may be made of a material including indium tin oxide (ITO). The surface treatment layer 180 is located on the surface 162a of the touch sensing layer 160 facing away from the transparent lower refraction index layer 170. The surface treatment layer 180 may be a hard coating (HC) layer, an anti-glare (AG) layer, or an anti-reflection (AR) layer, and the present invention is not limited in this regard. The surface treatment layer 180 can improve the optical quality of the front light display device 100 or the strength of the front light display device 100, and the type of the surface treatment layer 180 may be suitably selected as deemed necessary by designers.

In this embodiment, the size of the light guide plate 120 is greater than the size of the reflective display module 110, such that a side of the light guide plate 120 having the third surface 126 protrudes from the reflective display module 110 for the arrangement of the light source 150. As a result of such a design, the light source 150 can be prevented from being too close to the reflective display module 110 which affects the uniformity of brightness. In addition, the light guide plate 120 has a fourth surface 128 opposite to the third surface 126. The fourth surface 128 of the light guide plate 120 and a side of the reflective display module 110 are coplanar. The front light display device 100 further includes a waterproof glue 190. The waterproof glue 190 surrounds the reflective display module 110 and the optical clear adhesive 130, and at least one portion of the waterproof glue 190 extends to the fourth surface 128 of the light guide plate 120, thereby preventing moisture from entering the reflective display module 110.

It is to be understood that the connection relationships and materials of the elements described above will not be described again in the following description.

Figure 2:
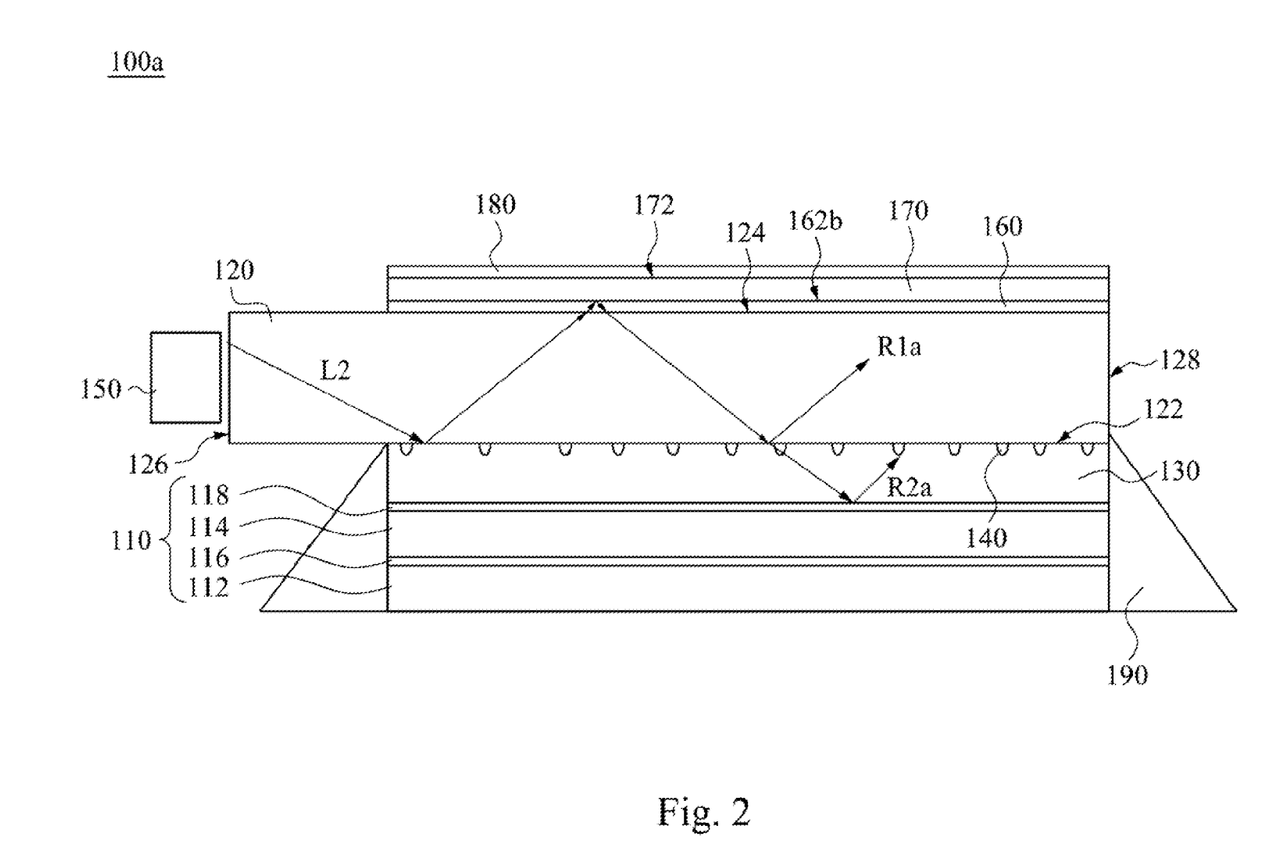
FIG. 2 is a cross-sectional view of a front light display device according to another embodiment of the present invention.

FIG. 2 is a cross-sectional view of a front light display device 100a according to another embodiment of the present invention. The front light display device 100a includes the reflective display module 110, the light guide plate 120, the optical clear adhesive 130, the microstructures 140, the light source 150, the touch sensing layer 160, the transparent lower refraction index layer 170, and the surface treatment layer 180. The difference between this embodiment and the embodiment shown in FIG. 1 is that the touch sensing layer 160 is located on the second surface 124 of the light guide plate 120, and the transparent lower refraction index layer 170 is located on the surface 162b of the touch sensing layer 160 facing away from the light guide plate 120, and the surface treatment layer 180 is located on the surface 172 of the transparent lower refraction index layer 170 facing away from the touch sensing layer 160. As a result of such a design, when the light source 150 emits light, although light L2 may enter the touch sensing layer 160, the transparent lower refraction index layer 170 on the touch sensing layer 160 can reflect the light L2. Hence, the light L2 returns to the light guide plate 120, thereby improving the light guide efficacy of the light guide plate 120.

Moreover, the light L2 shown in FIG. 2 only forms reflective lights R1a, R2a respectively at the interface between the light guide plate 120 and the optical clear adhesive 130 and at the interface between the optical clear adhesive 130 and the common electrode layer 118, and thus the visual interference can be effectively reduced.

Figure 3:
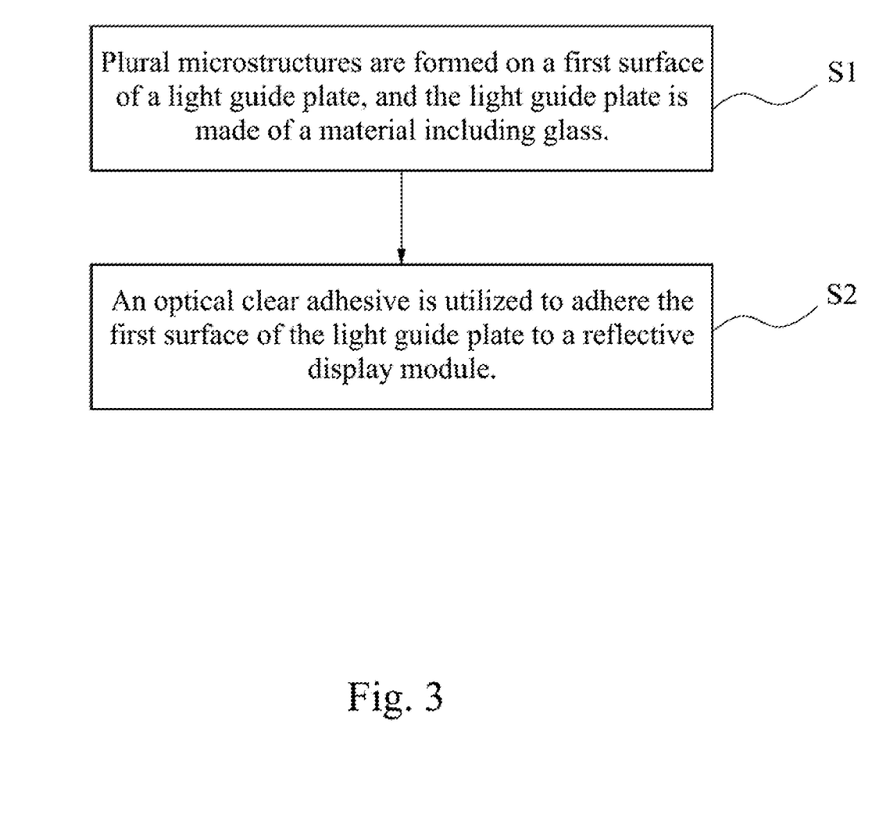
FIG. 3 is a flow chart of a manufacturing method of a front light display device according to one embodiment of the present invention.

FIG. 3 is a flow chart of a manufacturing method of a front light display device according to one embodiment of the present invention. The manufacturing method of the front light display device includes the following steps. In step S1, plural microstructures are formed on a first surface of a light guide plate, and the light guide plate is made of a material including glass. Thereafter, in step S2, an optical clear adhesive is utilized to adhere the first surface of the light guide plate to a reflective display module.

Step S1 of forming the microstructures may further include the following steps. An ultra-violet curing adhesive is coated on the first surface of the light guide plate. Thereafter, a rolling treatment or a laminating treatment is performed on the first surface of the light guide plate, thereby shaping the ultra-violet curing adhesive. Finally, an ultra-violet light is utilized to irradiate the ultra-violet curing adhesive, thereby curing the ultra-violet curing adhesive to form the microstructures.

In addition, the manufacturing method of the front light display device further includes the following steps. A touch sensing layer is formed on a second surface of the light guide plate. Thereafter, a transparent lower refraction index layer is formed between the touch sensing layer and the light guide plate, or on a surface of the touch sensing layer facing away from the light guide plate. If the transparent lower refraction index layer is formed between the touch sensing layer and the light guide plate, the structure shown in FIG. 1 can be obtained. If the transparent lower refraction index layer is formed on the surface of the touch sensing layer facing away from the light guide plate, the structure shown in FIG. 2 can be obtained.

In the following description, other types of the front light display devices will be described.

Figure 4:
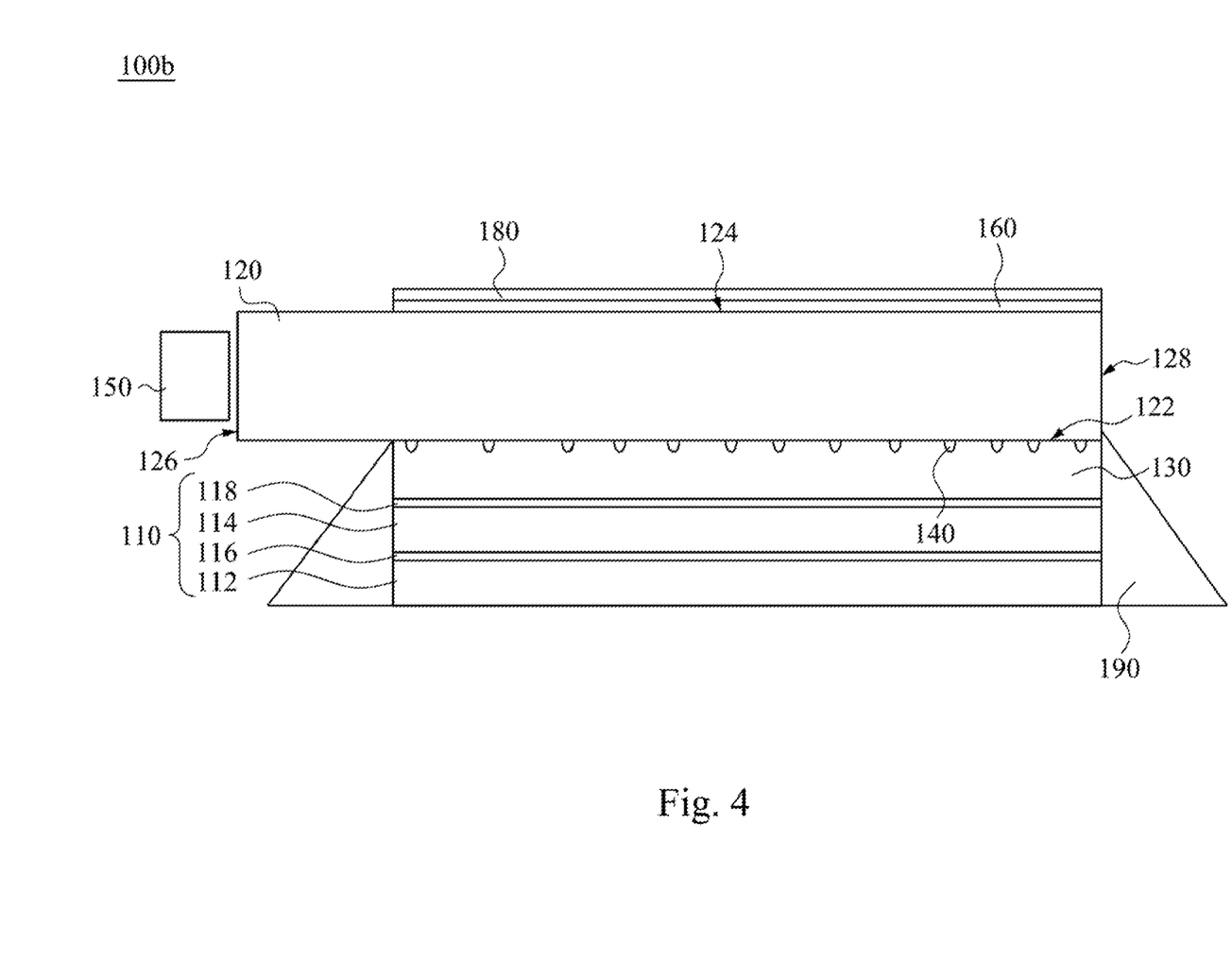
FIG. 4 is a cross-sectional view of a front light display device according to another embodiment of the present invention.

FIG. 4 is a cross-sectional view of a front light display device 100b according to another embodiment of the present invention. The front light display device 100b includes the reflective display module 110, the light guide plate 120, the optical clear adhesive 130, the microstructures 140, the light source 150, the touch sensing layer 160, and the surface treatment layer 180. The difference between this embodiment and the embodiment shown in FIG. 1 is that the front light display device 100b does not have the transparent lower refraction index layer 170. As a result, the thickness of the front light display device 100b is smaller than that of the front light display device 100, thus facilitating thinning design of the display device. In addition, the surface treatment layer 180 is located on the surface of the touch sensing layer 160 facing away from the light guide plate 120.

Figure 5:
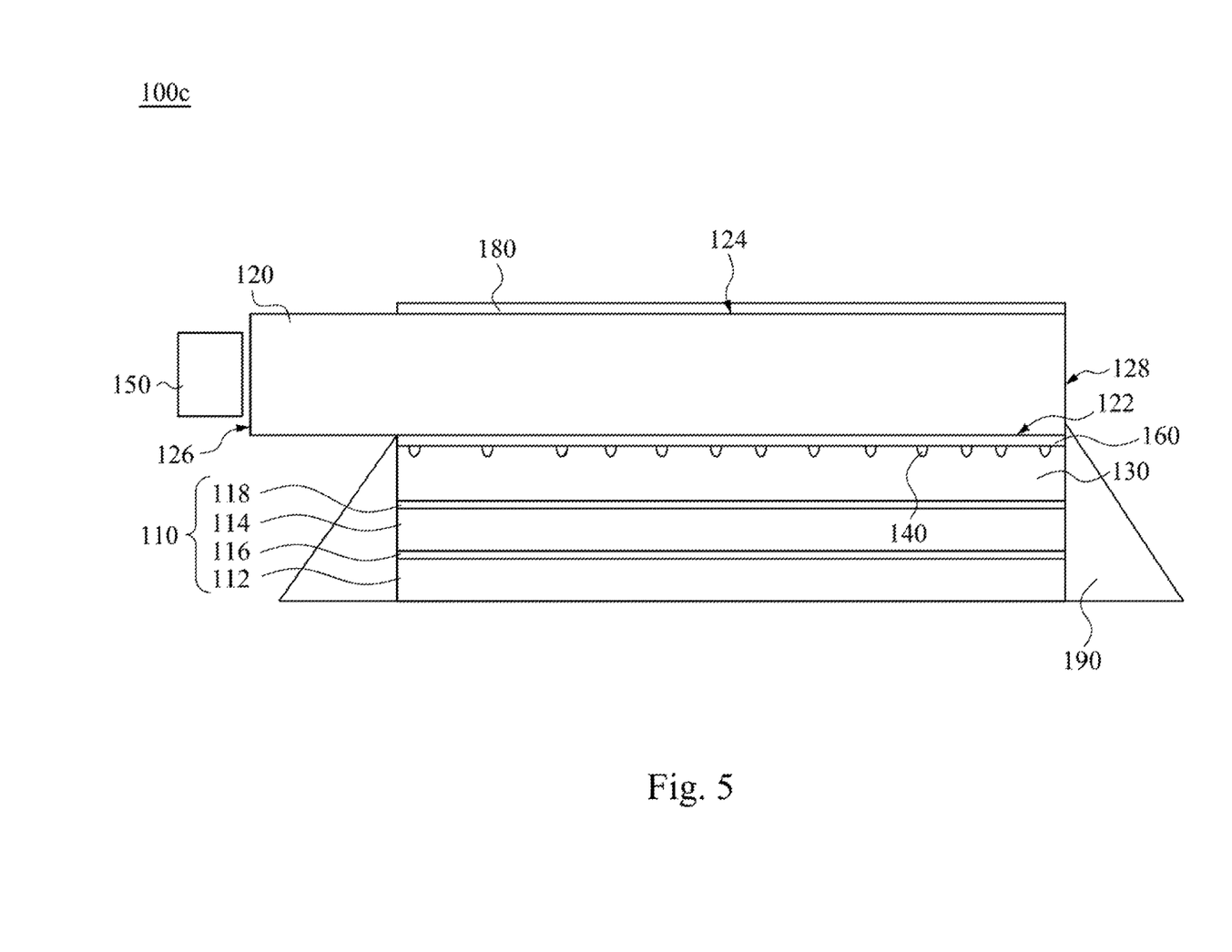
FIG. 5 is a cross-sectional view of a front light display device according to another embodiment of the present invention.

FIG. 5 is a cross-sectional view of a front light display device 100c according to another embodiment of the present invention. The front light display device 100c includes the reflective display module 110, the light guide plate 120, the optical clear adhesive 130, the microstructures 140, the light source 150, the touch sensing layer 160, and the surface treatment layer 180. The difference between this embodiment and the embodiment shown in FIG. 4 is that the touch sensing layer 160 of the front light display device 100c is located between the microstructures 140 and the first surface 122 of the light guide plate 120, and the surface treatment layer 180 is located on the second surface 124 of the light guide plate 120. As a result of such a design, the front light display device 100c still has a touch-control function. Furthermore, the surface treatment layer 180 can improve the optical quality of the front light display device 100c or the strength of the front light display device 100c, and the type of the surface treatment layer 180 may be suitably selected as deemed necessary by designers.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A front light display device, comprising:
 a reflective display module;
 a light guide plate having a first surface, a second surface opposite to the first surface, and a third surface adjacent to the first surface and the second surface, wherein the light guide plate is made of a material comprising glass;

an optical clear adhesive located between the reflective display module and the first surface of the light guide plate;

a plurality of microstructures located on the first surface of the light guide plate;

a light source facing the third surface of the light guide plate; and a touch sensing layer between the microstructures and the first surface of the light guide plate.

2. The front light display device of claim 1, further comprising:

a surface treatment layer located on the second surface of the light guide plate.

3. The front light display device of claim 1, wherein a thickness of the optical clear adhesive is greater than a height of each of the microstructures.

4. The front light display device of claim 1, wherein a thickness of the optical clear adhesive is h, and a height of each of the microstructures is d, and h>5d.

5. The front light display device of claim 1, wherein the microstructures are made of a material comprising an ultra-violet curing adhesive.

6. The front light display device of claim 1, wherein a size of the light guide plate is greater than a size of the reflective display module, such that a side of the light guide plate having the third surface protrudes from the reflective display module.

7. The front light display device of claim 1, wherein the light guide plate has a fourth surface opposite to the third surface, and the fourth surface and a side of the reflective display module are coplanar.

8. The front light display device of claim 7, further comprising:

a waterproof glue surrounding the reflective display module and the optical clear adhesive, wherein at least one portion of the waterproof glue extends to the fourth surface of the light guide plate.

9. A manufacturing method of a front light display device, comprising:

(a) forming a touch sensing layer on a first surface of a light guide plate;

(b) forming a plurality of microstructures on the first surface of the light guide plate such that the touch sensing layer is between the microstructures and the first surface of the light guide plate, wherein the light guide plate is made of a material comprising glass; and (c) utilizing an optical clear adhesive to adhere the first surface of the light guide plate to a reflective display module.

10. The manufacturing method of the front light display device of claim 9, wherein step (b) comprises:

coating an ultra-violet curing adhesive on the first surface of the light guide plate;

performing a rolling treatment or a laminating treatment on the first surface of the light guide plate, thereby shaping the ultra-violet curing adhesive; and utilizing an ultra-violet light to irradiate the ultra-violet curing adhesive, thereby curing the ultra-violet curing adhesive to form the microstructures.

11. The manufacturing method of the front light display device of claim 9, further comprising:

forming a surface treatment layer on a second surface of the light guide plate opposite to the first surface of the light guide plate.

\* \* \* \* \*